United States Patent [19]
White
[11] Patent Number: 4,521,466
[45] Date of Patent: Jun. 4, 1985

[54] CELLULAR SEAL COATING

[75] Inventor: Leonard A. White, Gurnee, Ill.
[73] Assignee: Baxter Travenol Laboratories, Inc., Deerfield, Ill.

[21] Appl. No.: 530,891
[22] Filed: Sep. 12, 1983
[51] Int. Cl.³ .......... B32B 3/12; B32B 5/18
[52] U.S. Cl. .......... 428/35; 428/159; 428/304.4; 156/77; 156/78; 156/79
[58] Field of Search .......... 428/35, 159, 158, 304.4, 428/308.4; 156/77, 78, 79

[56] References Cited

U.S. PATENT DOCUMENTS

| | | | |
|---|---|---|---|
| 2,872,965 | 2/1959 | Sisson | 154/1 |
| 3,207,646 | 9/1965 | Hacklander | 156/281 |
| 3,213,071 | 10/1965 | Campbell | 260/88.2 |
| 3,303,954 | 2/1967 | Beaudet et al. | 215/39 |
| 3,380,866 | 4/1968 | Ginter | 156/79 |
| 3,649,324 | 3/1972 | Payne | 117/9 |
| 3,649,731 | 3/1972 | Cronin | 264/47 |
| 3,650,880 | 3/1972 | Tieniber | 161/89 |
| 3,687,774 | 8/1972 | Grubstad | 156/324 |
| 3,806,566 | 4/1974 | Rubens | 264/46 |
| 3,829,343 | 8/1974 | Remmert | 156/322 |
| 3,834,962 | 9/1974 | Strumbos | 156/79 |
| 3,906,134 | 9/1975 | Pohl | 428/206 |
| 3,941,633 | 3/1976 | Wang et al. | 156/77 |
| 4,022,643 | 5/1977 | Clark | 156/78 |
| 4,022,943 | 5/1977 | Erb | 428/159 |
| 4,053,545 | 10/1977 | Fay | 264/46.4 |
| 4,182,641 | 1/1980 | Fitts | 156/77 |
| 4,273,820 | 6/1981 | Swietzer | 428/159 |
| 4,302,272 | 11/1981 | Phillips et al. | 156/309.9 |
| 4,414,354 | 11/1983 | Slocombe | 524/460 |

*Primary Examiner*—Roland E. Martin
*Assistant Examiner*—James J. Seidleck
*Attorney, Agent, or Firm*—Bradford R. L. Price; Paul C. Flattery; John Kirby

[57] ABSTRACT

A cellular seal coating is provided for uses such as assembling composite packages, which cellular seal coating is formed by electrostatically depositing finely divided, electrostatically chargeable bonding agent particles onto a preassembly member. Such bonding agent particles include a chemical blowing or foaming agent or system which forms gas bubbles when heated or otherwise energized in order to alter the thickness and strength of the seal coating so that it may, for example, fill gaps along assembly locations of a package or other article.

19 Claims, 7 Drawing Figures

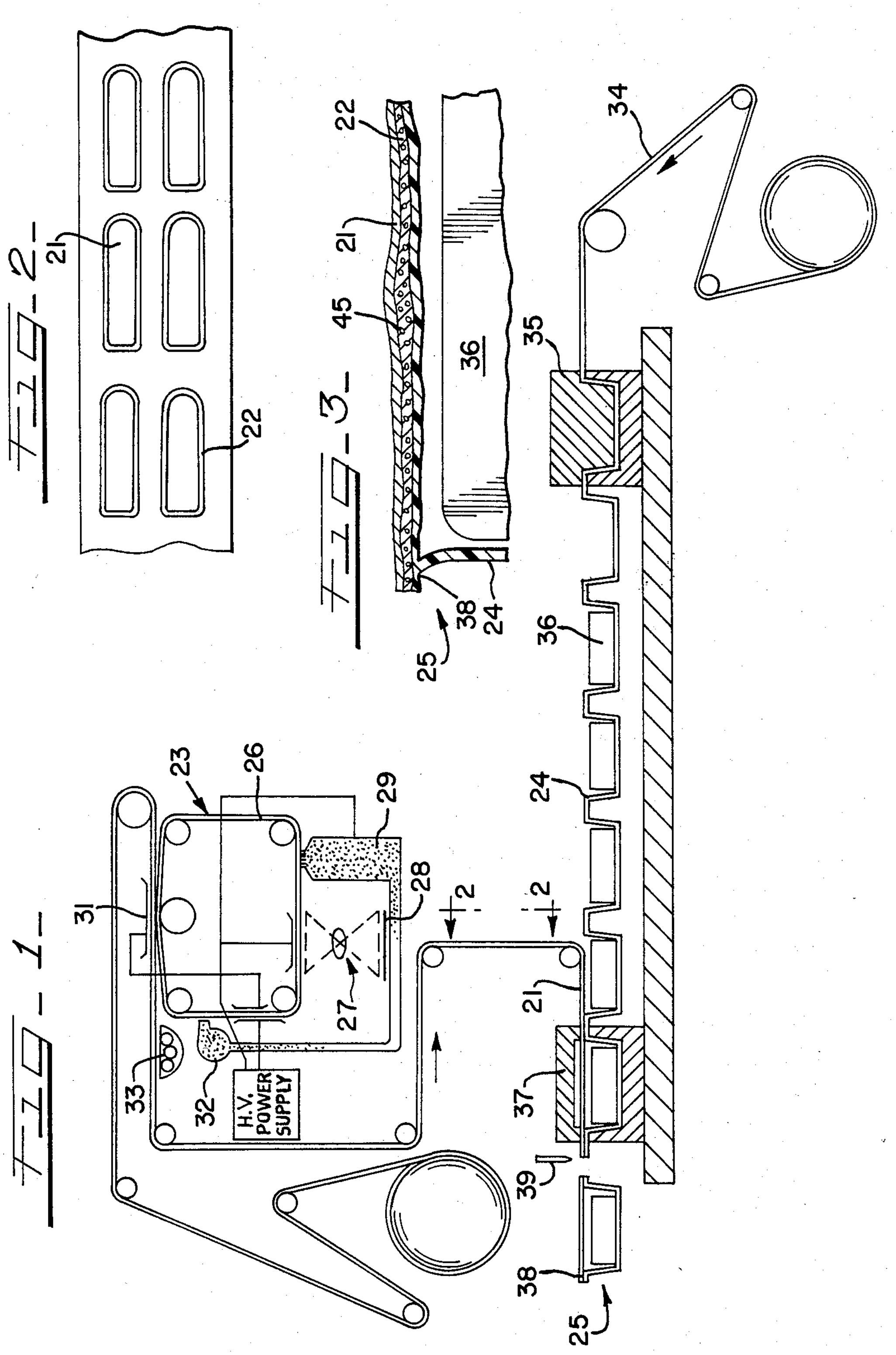
H.V.
POWER
SUPPLY

FIG. 4
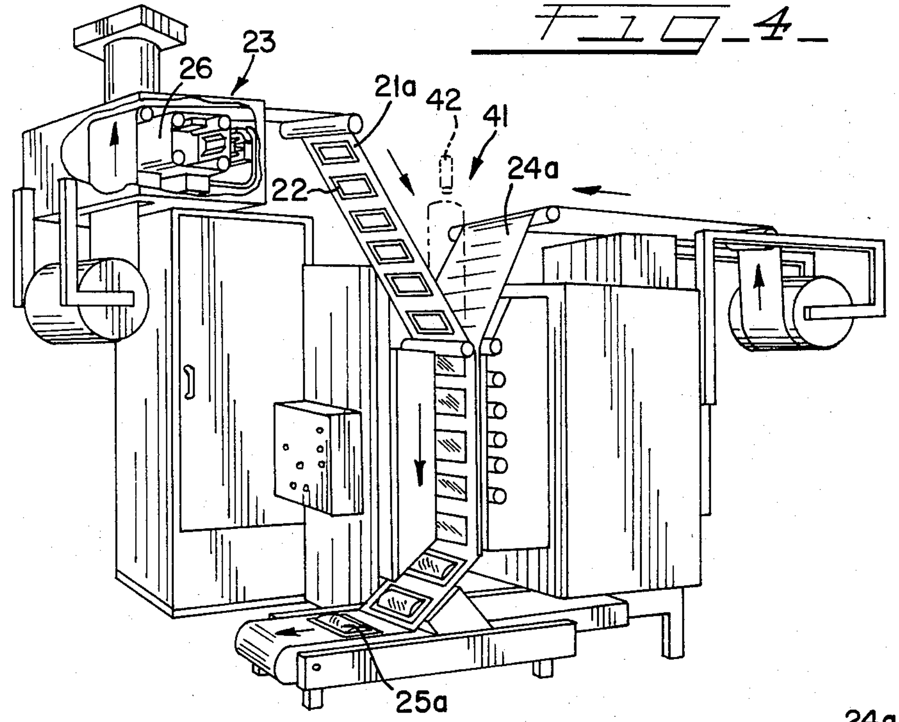
FIG. 7
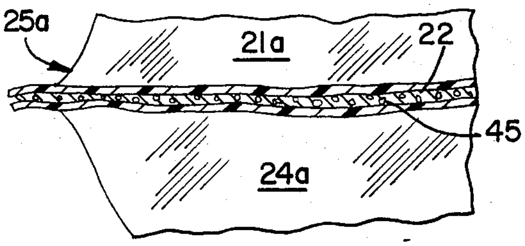
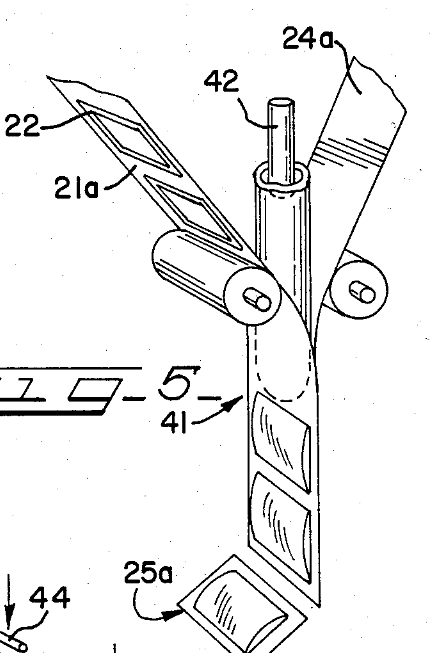
FIG. 5
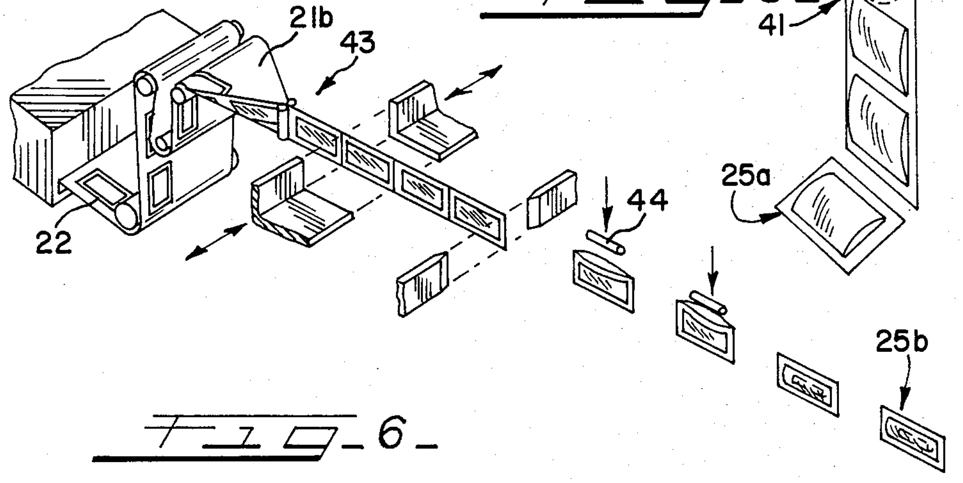
FIG. 6

CELLULAR SEAL COATING

This invention generally relates to cellular seal coatings, to articles including same, and to a method of producing such articles and coatings. More particularly, the present invention provides bonding agent particles that are electrostatically deposited onto a preassembly member or onto a web of preassembly members, which bonding agent particles include a blowing or foaming agent or system. These electrostatically deposited bonding agent particles are heated or otherwise energized, typically along a specific seal pattern, in order to adhere the preassembly members together with a cellular bonding agent.

There are many instances today of packages and the like wherein heat seal coatings are needed, typically for adhering two or more preassembly members together. Examples include so-called blister packs for packaging an article within a semi-rigid container that conforms rather closely to the shape and size of the article being packaged. Other packaging systems include more flexible pouches wherein mating surfaces are joined by a bonding agent in order to seal a product therewithin. Other systems utilize a variety of structures wherein two or more items are laminated together by the use of a bonding agent that is responsive to the application of heat or other energy in order to render same generally tacky to thereby hold the items or preassembly members together. Each of these can be characterized as utilizing a heat seal coating in order to form a laminate. These laminates can be of varying bond strengths, depending upon the materials being joined together and whether or not the seal thus formed is to be of the permanent or of the peelable variety.

Often these laminates are formed by adhering the preassembly members together by means of a bonding agent that is an adhesive or glue. In the usual commercial application, such bonding agents are applied to one or more preassembly members in conjunction with a suitable carrier, whereby the bonding agent is applied as a solution, an emulsion, or a suspension. It is a common practice that such carrier-based bonding agents are applied by the manufacturer of the laminated package by application devices such as those utilizing rollers, a doctor knife, air blades, brushes, or extruders.

In some instances, the packager attempts to apply the bonding agent only where it is needed at the bonding interface of the components being sealed together. In other instances, an entire closure member or web of closure members is pre-coated with the bonding agent, and bonding is accomplished when energy is applied to the closure member such that the bonding agent is activated at only those locations at which bonding is to occur. Although this latter practice results in an inefficient use of the bonding agent composition, it is in wide use because of the difficulty and expense that is involved in attempting to apply a carrier-based bonding agent to only that portion of the closure member that will actually be sealed to another portion of the package.

An additional negative aspect of this practice of coating the entire surface of the closure member rather than only those portions that are needed to seal the package is encountered when a package that is formed, filled and sealed is subsequently subjected to bacteria-controlling conditions. For example, many medical implements, articles, devices or other products utilized in the medical industry must be packaged in a sterile or an aseptic environment so that they will be ready for immediate use when the doctor, nurse or medical technician removes the article or product from the package. Usually this is achieved by placing the article within a closure member, sealing the closure member with a gas permeable lid, and then subjecting the entire package to bacteria-controlling conditions.

Such bacteria-controlling procedures typically include treatment either with a gas which must pass through a breathable lid stock or with radiation that passes through the sealed package in order to treat the interior of the sealed composite package. When a gas treatment is used, the porosity or breathability needed for accomplishing this procedure is impaired when a carrier-based bonding agent is coated on substantially the entire surface of the preassembly member. This decreased porosity requires a longer and harsher bacteria-controlling or sterilization procedure than that required for passage through the same preassembly member that is not so coated, thereby increasing treatment costs and developing additional stresses on the package seals during treatment. When radiation sterilization is carried out, the coating on the preassembly member of a carrier-based bonding agent will be subjected to radiation which may alter the coating and possibly interfere with the bacteria-controlling objective.

Another difficulty that can continually arise in attempting to maintain a consistent seal is the often-observed variation in the gap between surfaces to be sealed, which is primarily due to manufacturing tolerances of the webs or preassembly members being joined. Additional inconsistency will typically be observed due to inherent inconsistencies in the heat sealing or energy applying equipment whereby the heat or energy is not uniformly imparted to each and every location along the heat seal.

In many applications, it is desirable to have the seal pattern provide a "line of weakness" which is designed to provide a seal failure zone at which the preassembly members separate from each other when it is desired to open the package. Such failure zones are important for enhancing the ease with which a package is opened and, more importantly, the cleanness with which a package opens. It is, for example, possible to provide too strong an adhesion to a paper web which results in paper delamination, a poor tear pattern, and possibly generating excessive fiber and other particulate matter that is especially undesirable when the item packaged is a medical or food article or the like.

Disadvantages and difficulties such as these are alleviated by the present invention which eliminates the need to coat the entire surface of a preassembly member with a bonding agent while simultaneously providing a bonding agent seal path that is cellular in nature which imparts to the heat seal the ability to expand into gaps along a seal pattern and/or to formulate the bonding agent to provide a zone of weakness that is of reduced strength when compared with the preassembly member or members. The present invention utilizes electrostatic deposition techniques that avoid the use of liquid carriers and that permit inexpensive and accurate means for depositing a bonding agent in a seal pattern which can be of virtually any configuration. The bonding agent utilized in the present invention further includes a blowing or foaming agent or system for developing gas bubbles when the bonding agent is heated, energized or otherwise cured in order to provide a bond that has cellular properties which permit same to readily conform to the surface configuration along a bonding location, including expanding into gaps that can be indiscriminately located therealong.

It is, accordingly, a general object of the present invention to provide an improved heat seal coating.

Another object of this invention is to provide an improved product and method of providing same wherein panels of the product are adhered together by a bonding agent that has a generally cellular structure and that had been electrostatically deposited onto at least one of the panels.

Another object of the present invention is to provide an improved method and product utilizing electrostatic deposition techniques to form a precise, cellular seal pattern.

Another object of this invention is to provide an improved product and method for making same, which product has an improved failure zone for facilitating efficient and clean opening of laminated components of the product.

These and other objects of the present invention will become apparent from the following detailed description and drawings, wherein:

FIG. 1 is a schematic view illustrating the method of this invention and an apparatus upon which same may be carried out;

FIG. 2 is a plan view along the line 2—2 of FIG. 1 illustrating a preassembly member web having a plurality of seal patterns thereon;

FIG. 3 is an enlarged, broken-away detail view of a portion of a package prepared on an apparatus such as that illustrated in FIG. 1;

FIG. 4 is a perspective view illustrating another embodiment in accordance with this invention;

FIG. 5 is an enlarged, detail perspective view of the filling station of the embodiment illustrated in FIG. 4;

FIG. 6 is a schematic illustration of a further embodiment according to this invention; and FIG. 7 is an enlarged, broken-away detail view of a product prepared according to FIGS. 4, 5 and 6.

By the present invention, a preassembly member or a continuous web of preassembly members 21, 21*a*, 21*b* is prepared to include a seal coating 22 deposited thereon, which deposited seal coating includes a chemical blowing or foaming agent or system. Seal coating 22 is electrostatically deposited by a suitable electrostatic deposition unit, which is generally designated at 23. Each preassembly member 21, 21*a*, 21*b* is bonded either to itself or to another preassembly member 24, 24*a*, and thereafter adhered together by applying energy to the seal coating in order to form a product such as package 25, 25*a*, 25*b*.

Major structural and functional details of a representative electrostatic deposition unit 23 include an endless surface 26, which typically has a photoconductive material on its outside surface, and a lens and light system 27 for developing an electrostatic charge pattern on the endless surface 26, this pattern being of a configuration dictated by an original pattern 28, which may be of substantially any shape and cover as small or as large a portion of the available space that is desired to be coated. In accordance with well-known techniques, the light energy supplied by the lens and light system 27 selectively alters the electrostatic charge characteristics of at least a portion of the endless surface 26.

A powder transfer station 29 deposits finely divided bonding composition particles having a blowing or foaming agent onto the endless surface 26 at the location of the selectively altered electrostatic charge pattern in order to form a substantially identically shaped pattern of such particles on the endless surface 26. This pattern of particles is then transferred to form the preassembly members 21, 21*a*, 21*b* having the seal coating 22 deposited thereon, typically in association with a charged transfer platten 31. Residual particles remaining after this transfer are removed by a suitable removal assembly 32, such as a vacuum system, after which that portion of the endless surface 26 is ready for repetition of this cycle including selective charging, particle deposition, and transfer.

Depending upon certain particulars of the system used in accomplishing this invention, such as whether the charge transfer platten 31 adequately adheres the particles to the preassembly member 21, 21*a*, 21*b*, and whether the preassembly member having the seal coating 22 deposited thereon must be stored for any length of time and possibly rolled onto itself, there may be provided a heat source 33 for more thoroughly fusing the heat seal coating 22 to the preassembly member.

In the embodiment illustrated in FIG. 1, the preassembly member 24 takes the form of container members that are thermoformed from a web 34 of moldable polymer, the forming thereof being accomplished at a forming station 35. Articles 36 which may be packaged in accordance with this invention are, when desired, inserted into each container member at a location between the forming station 35 and a closure station 37. Typically, the deposited seal coating 22 is patterned to be in general alignment with a sealing lip 38 of the package 25. Each package 25 may be separated from the continuous web by a suitable structure such as the illustrated severance member 39.

Sealing or lamination is accomplished at the closure station 37 by applying energy, such as by means of a heat sealing bar or plate which energizes the deposited seal coating 22 to a state at which the blowing or foaming agent or system forms gas bubbles within the seal coating 22 while the seal coating 22 bonds or laminates the surfaces together at the thus energized locations.

Concerning the embodiment illustrated in FIGS. 4 and 5, the preassembly member 21*a* having the seal coating 22 deposited thereon passes through a forming and filling assembly, generally designated as 41. Assembly 41 forms a pouch, fills product 42 thereinto and seals the pouch in order to form a finished pouch or article 25*a*. FIG. 6 illustrates an embodiment similar to that illustrated in FIGS. 4 and 5, except it includes a preassembly member 21*b* that is oriented in a generallly horizontal direction and that is folded upon itself at a forming station 43, after which it is filled with a product 44 and sealed in order to form the package 25*b*.

FIGS. 3 and 7 provide an illustration of the deposited seal coating 22 after same has been heated or otherwise energized in order to bond the preassembly member to itself or to another preassembly member. The cellular structure characteristic of the heat seal bond formed in accordance with this invention is illustrated as including a plurality of expansion sites or pores 45 that were formed by gas bubbles which were generated during the time that the seal coating 22 was energized. The expansion sites, pores or bubbles 45 tend to be more concentrated at the locations where the preassembly members are spaced farther apart, or where gaps therebetween are irregularly located and sized to have a more extensive open area that at other locations.

Typically, when the bonding composition is energized, its particles are raised to a sealing temperature therefor that is at or above its softening point and below the softening point or scorching temperature of the materials out of which each preassembly member is made. Representative sealing temperatures are usually not substantially lower than about 95° C. and possibly as high as about 330° C. if the seal time is rapid (on the order of a fraction of a second) and/or if the bonding agent and its foaming system are exceptionally responsive to heat activation.

Preassembly members included within this invention are films and sheets of any number of polymers, papers, coated papers and the like. Included are flexible polymeric materials such as polyvinyl chloride, acrylonitriles, polyolefins, including homopolymers and copolymers, cellulosic materials such as surgical Kraft paper and other papers, synthetic breathable materials such as so-called synthetic paper and paper of the polymeric type such as non-woven polymer film material.

The bonding agent particles that are included in the seal coating according to this invention are typically dielectric in nature and exhibit bonding properties when activated, such as by heating, to a state at which the activated bonding agent particles adhere the preassembly members to itself or to another member. The particular bonding agent chosen should have a softening temperature equal to or less than the softening temperature of the preassembly members. Typically, these bonding agents are thermoplastic polymers or resins, although certain thermosetting materials also can be utilized. These bonding agents typically possess dielectric properties to the extent that they are not totally conductive and can hold a charge. Specific bonding agent particles can be chosen so as to be tailored for the particular preassembly member or members being adhered together. They include bonding agent particles that cannot be applied by carrier systems or that can be applied only by carrier systems that are not water-based but include substantial quantities of organic solvents.

Representative bonding agent particles include polyolefins such as polypropylene and high and low density polyethylene, copolymers of polyethylene and ethylene vinyl acetate, copolymers of polyethylene and methyl methacrylate, copolymers of polyethylene and ethylene acetate, as well as other polymers, waxes and blends that have been modified to enhance their hot tack properties. Others include styrenes such as styrene copolymers and blends, modified phenylene oxides, unsaturated polyesters, nylon, polycarbonates, polyvinyl chloride, ethylene vinyl acetate, and the like.

The blowing or foaming agent or system that is included within the bonding composition and the seal coating formed therefrom are generally classified as being either inorganic or organic, and they liberate a gas such as nitrogen, carbon dioxide, carbon monoxide, ammonia or the like when they are heated or otherwise energized in order to achieve a chemical reaction or decomposition thereof. For example, the inorganic blowing or foaming system of sodium bicarbonate and hydrous citric acid releases carbon dioxide gas when heated.

Representative organic chemical blowing or foaming agents or systems include p-toluenesulfonylhydrazide, p-p'-oxy-bis-benzenesulfonylhydrazide, p-toluenesulfonyl semicarbazide, 1,1'-azobisformamide, 5-phenyltetrazole, trihydrazinetriazine, and the like. Generally speaking, the chemical blowing or foaming agent will be included within the heat seal coating at a concentration of between about 0.05 to 5.0 weight percent, based upon the total weight of the heat seal coating prior to energization.

Activators and decomposition accelerators optionally may be included in association with these chemical blowing or foaming agents or systems in order to achieve, at a particlar reaction temperature or under selected energy-imparting conditions, the desired rate and extent of gas generation and resultant formation of the expansion sites, pores or bubbles. For example, when a peelable seal is desired or when a line of weakness or failure zone is required along the seal coating in order to avoid damage to the preassembly members when a package made therefrom is opened, the amount of blowing or foaming agent and the quantity of accelerator therefor may be adjusted in order, for example, to increase the volume of the expansion sites within, or the porosity of, the seal coating that is formed. Typical activators or decomposition accelerators include metal salts, such as zinc, cadmium and lead salts, metal stabilizers, glycols, alcohols, antioxidants, urea, amines, peroxides and acids such as stearic acid.

It will be understood that the embodiments of the present invention which have been described are merely illustrative of a few of the applications of the principals of the present invention. Numerous modifications may be made by those skilled in the art without departing from the true spirit and scope of the invention.

I claim:

1. A solventless method for providing seal coatings, comprising:

formulating a bonding composition, including finely divided, electrostatically chargeable bonding agent particles that are activatable to a state at which the bonding agent particles adhere preassembly members together, said bonding agent composition further including a blowing agent that develops gas bubbles when the bonding composition is activated to said state at which the bonding agent particles adhere preassembly members together;

electrostatically depositing said bonding composition onto a preassembly member; and activating said deposited bonding composition in order to seal said preassembly member with a cellular bond, said activating step including activating said blowing agent within the bonding composition to thereby impart cellular properties to said cellular bond.

2. The method of claim 1, wherein said electrostatic depositing step includes depositing said bonding composition in a predetermined pattern.

3. The method of claim 1, wherein said activating step includes heating said electrostatically deposited bonding composition.

4. The method of claim 1, wherein said formulating step includes selecting dielectric bonding agent particles.

5. The method of claim 1, wherein said blowing agent is an inorganic system that liberates a gas during said activating step.

6. The method of claim 1, wherein said blowing agent includes an organic chemical that liberates a gas during said activating step.

7. The method of claim 1, wherein said formulating step includes adding between about 0.05 and 5.0 weight percent of said blowing agent, based on the total weight of said bonding composition.

8. An article having a seal coating formed by a method comprising:

formulating a bonding composition, including finely divided, electrostatically chargeable bonding agent particles that are activatable to a state at which the bonding agent particles adhere preassembly members together, said bonding composition further including a blowing agent that develops gas bubbles when the bonding composition is activated to said state at which the bonding agent particles adhere preassembly members together;

electrostatically depositing said bonding composition onto a preassembly member; and activating said deposited bonding composition in order to seal said preassembly member with a cellular bond, said activating step including activating said blowing agent within the bonding composition to thereby impart cellular properties to said cellular bond.

9. The article of claim 8, wherein said electrostatic depositing step includes depositing said bonding composition in a predetermined pattern.

10. The article of claim 8, wherein said activating step includes heating said electrostatically deposited bonding composition.

11. The article of claim 8, wherein said formulating step includes selecting dielectric bonding agent particles.

12. The article of claim 8, wherein said blowing agent is an inorganic system that liberates a gas during said activating step.

13. The article of claim 8, wherein said blowing agent includes an organic chemical that liberates a gas during said activating step.

14. The article of claim 8, wherein said formulating step includes adding between about 0.05 and 5.0 weight percent of said blowing agent, based on the total weight of said bonding composition.

15. An article having a seal coating, comprising:

an assembly member having a panel that includes a seal coating thereon, said seal coating being a cellular bond that includes a bonding agent having gaseous cells interspersed therewithin; and said cellular bond is formed from a bonding composition including bonding agent particles and a blowing agent that develops gas bubbles when the bonding composition is activated to a state at which said bonding agent particles form the seal coating, said bonding agent particles being electrostatically chargeable.

16. The seal coating article of claim 15, including a plurality of said panels having respective surfaces thereof butting against each other and including gaps at locations between said butting respective surfaces, said gaps being substantially filled with said seal coating cellular bond.

17. The seal coating article of claim 15, wherein said article is a package having a plurality of assembly members, one assembly member being thermoformed and the other assembly member being a substantially flat closure member, and wherein said seal coating cellular bond is located along a sealing lip between said assembly members.

18. The seal coating article of claim 15, wherein said article is a packaging pouch.

19. The seal coating article of claim 15, wherein said article includes a plurality of panels bonded together by said cellular seal coating, and said cellular bond is a peelable seal having a bonding strength that is weaker than either of said panels.

* * * * *